United States Patent
Sakamoto et al.

(10) Patent No.: US 6,342,910 B1
(45) Date of Patent: Jan. 29, 2002

(54) IMAGE FORMING APPARATUS TO FORM SMOOTH IMAGE WITH INCONSPICUOUS GRANULARITY

(75) Inventors: Koji Sakamoto; Noboru Sawayama, both of Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/580,875

(22) Filed: May 30, 2000

(30) Foreign Application Priority Data

May 27, 1999 (JP) .......................................... 11-147729

(51) Int. Cl.[7] .......................... G03G 15/00; G02B 26/10
(52) U.S. Cl. ......................................... 347/131; 399/308
(58) Field of Search ................................ 347/129, 131, 347/140; 399/302, 308, 223; 430/126

(56) References Cited

U.S. PATENT DOCUMENTS

| | | | |
|---|---|---|---|
| 4,680,646 A | | 7/1987 | Ikeda et al. |
| 5,774,771 A | * | 6/1998 | Kukimoto et al. .......... 399/223 |
| 5,905,013 A | | 5/1999 | Seto |
| 5,907,746 A | | 5/1999 | Kubota |
| 6,122,468 A | * | 9/2000 | Sakamoto et al. .......... 399/223 |

FOREIGN PATENT DOCUMENTS

| | | |
|---|---|---|
| EP | 0 540 221 | 5/1993 |
| EP | 0 847 188 | 6/1998 |
| JP | 07077858 A | 3/1995 |
| JP | 08298595 A | 11/1996 |

* cited by examiner

Primary Examiner—Joan Pendegrass
(74) Attorney, Agent, or Firm—Oblon, Spivak, McClelland, Maier & Neustadt, P.C.

(57) ABSTRACT

An image forming apparatus includes an image bearing member, and an image processing device whic processes image data of an image including pixels forming the image such that a gradation of the image is represented by a density of toner adhering pixels of the image forming pixels per unit area of the image. The image forming apparatus further includes a latent image forming device which forms an electrostatic latent image of the image including the image forming pixels on the image bearing member in accordance with the image data processed by the image processing device, a developing device which visualizes the electrostatic latent image of the image on the image bearing member to a toner image, and a transfer device which transfers the toner image on the image bearing member to a transfer member. A diameter of a pixel toner image of each toner adhering pixel of the toner image on the image bearing member is in a range of 20 $\mu$m to 50 $\mu$m, and the transfer device includes a primary transfer member, a primary transfer device which transfers the toner image on the image bearing member to the primary transfer member, and a secondary transfer device which transfers the toner image on the primary transfer member to the transfer member.

27 Claims, 4 Drawing Sheets

IMAGE FORMING APPARATUS TO FORM SMOOTH IMAGE WITH INCONSPICUOUS GRANULARITY

CROSS REFERENCE TO RELATED APPLICATIONS

This document claims priority and contains subject matter related to Japanese Patent Application No. 11-147729 filed in the Japanese Patent Office on May 27, 1999, the entire contents of which are hereby incorporated by reference.

BACKGROUND OF THE INVENTION

1. Field of the Invention

The present invention relates to an image forming apparatus such as a copying machine, a facsimile, a printer, or similar image forming apparatus, and more particularly relates to an image forming apparatus that can form a smooth image with inconspicuous granularity.

2. Discussion of the Background

In a known image forming apparatus, to form a toner image on a recording member such as a transfer sheet, first an electrostatic latent image is formed on a surface of a photoreceptor, serving as an image bearing member by irradiating the surface of the photoreceptor, which is uniformly charged, with a light beam emitted from an LD (Laser Diode) or an LED (Light Emitting Diode). Subsequently, the electrostatic latent image on the photoreceptor is developed with toner, and then the toner image is transferred to the recording member. The transferred toner image is fixed on the recording member by a fusing device.

In the above-described image forming apparatus, a gradation representation method is known wherein an electrostatic latent image of a high density image portion of an image is formed on the photoreceptor by emitting a light beam which is intense enough to fully attenuate the potential of the photoreceptor (hereinafter referred to as a saturation writing). Further, for a halftone (intermediate density) image portion and a highlight (low density) image portion, an electrostatic latent image having an intermediate potential is formed on the photoreceptor by changing the intensity and irradiating time of the light beam. In the image forming apparatus employing the above-described gradation representation method, in order to fully reproduce the gradation and the highlight image portion, a method may be generally employed wherein an electrostatic latent image of an intermediate potential is formed on the photoreceptor by changing the intensity and irradiating time of the light beam for each pixel, i.e., a basic unit forming an image (hereinafter referred to as a one dot multilevel process).

However, because static electricity is used to form an image in an electrophotographic recording process, an image quality, especially the gradation characteristic of a halftone intermediate image portion, may vary depending on the characteristic changes of the photoreceptor and the developer caused by environmental conditions (e.g., temperature and humidity) and a lapse of time.

Another gradation representation method is known wherein respective electrostatic latent images of high density, intermediate density, and highlight (low density) image portions are all formed by the above-described saturation writing, and the gradation is represented by changing a density of toner adhering pixels of the image forming pixels per unit area of the image (hereinafter referred to as a bilevel process). FIG. 4 is a graph illustrating a relation between the writing energy of a light beam and the surface potential of a photoreceptor. A characteristic line a1 represents a distribution of the writing energy of a light beam, and a characteristic line a2 represents a distribution of the surface potential of a dot of a pixel on the surface of the photoreceptor which is irradiated with the light beam.

Specifically, the surface of the photoreceptor is charged to a predetermined level, i.e., charged potential Vd. As illustrated in FIG. 4, when the surface of the photoreceptor is irradiated with the light beam which has maximum energy at the center of the curvature of the characteristic line al and is intense enough to attenuate the surface potential of the photoreceptor to approximately 0V, the surface potential of the center portion of the dot of the pixel on the photoreceptor is attenuated to approximately 0V. The diameter of the dot developed with toner is substantially the same as a diameter of a corresponding portion of the photoreceptor where the absolute value of the surface potential of the photoreceptor is smaller than an absolute value of a starting potential for developing.

If the above-described bilevel process is employed as the gradation representation method, an image quality can be more stable because the intermediate potential is not used for halftone and highlight image portions.

However, it is known that in the bilevel process, the toner adhering pixels are likely to be sharply outlined in a toner image formed on a transfer member, and thereby the image is likely to produce an impression that the image surface is granular (not smooth). In the electrophotographic apparatus, the image quality in the bilevel process is generally inferior to that in the one dot multilevel process in respect of smoothness of the image.

SUMMARY OF THE INVENTION

The present invention has been made in view of the above-discussed and other problems, and an object of the present invention is to address these problems.

The preferred embodiment of the present invention provides a novel image forming apparatus that can form a smooth image with inconspicuous granularity.

These objects and others are achieved according to the present invention by providing a novel image forming apparatus including an image bearing member, and an image processing device configured to process image data of an image including pixels forming the image such that a gradation of the image is represented by a density of toner adhering pixels of the image forming pixels per unit area of the image. The image forming apparatus further includes a latent image forming device configured to form an electrostatic latent image of the image including the image forming pixels on the image bearing member in accordance with the image data processed by the image processing device, a developing device configured to visualize the electrostatic latent image of the image on the image bearing member to a toner image, and a transfer device configured to transfer the toner image on the image bearing member to a transfer member.

A diameter of a pixel toner image of each toner adhering pixel of the toner image on the image bearing member is in a range of 20 μm to 50 μm, and the transfer device includes a primary transfer member, a primary transfer device configured to transfer the toner image on the image bearing member to the primary transfer member, and a secondary transfer device configured to transfer the toner image on the primary transfer member to the transfer member.

A toner scattering is generated around a nucleus portion of the pixel toner image of each toner adhering pixel of the toner image on the transfer member, and a diameter of the pixel toner image is 1.5 times or more a diameter of the nucleus portion of the pixel toner image on the transfer member.

According to the present invention, the image forming apparatus includes an image processing device configured to process image data of an image including pixels forming the image such that a gradation of the image is represented by a distance between toner adhering pixels of the image forming pixels.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
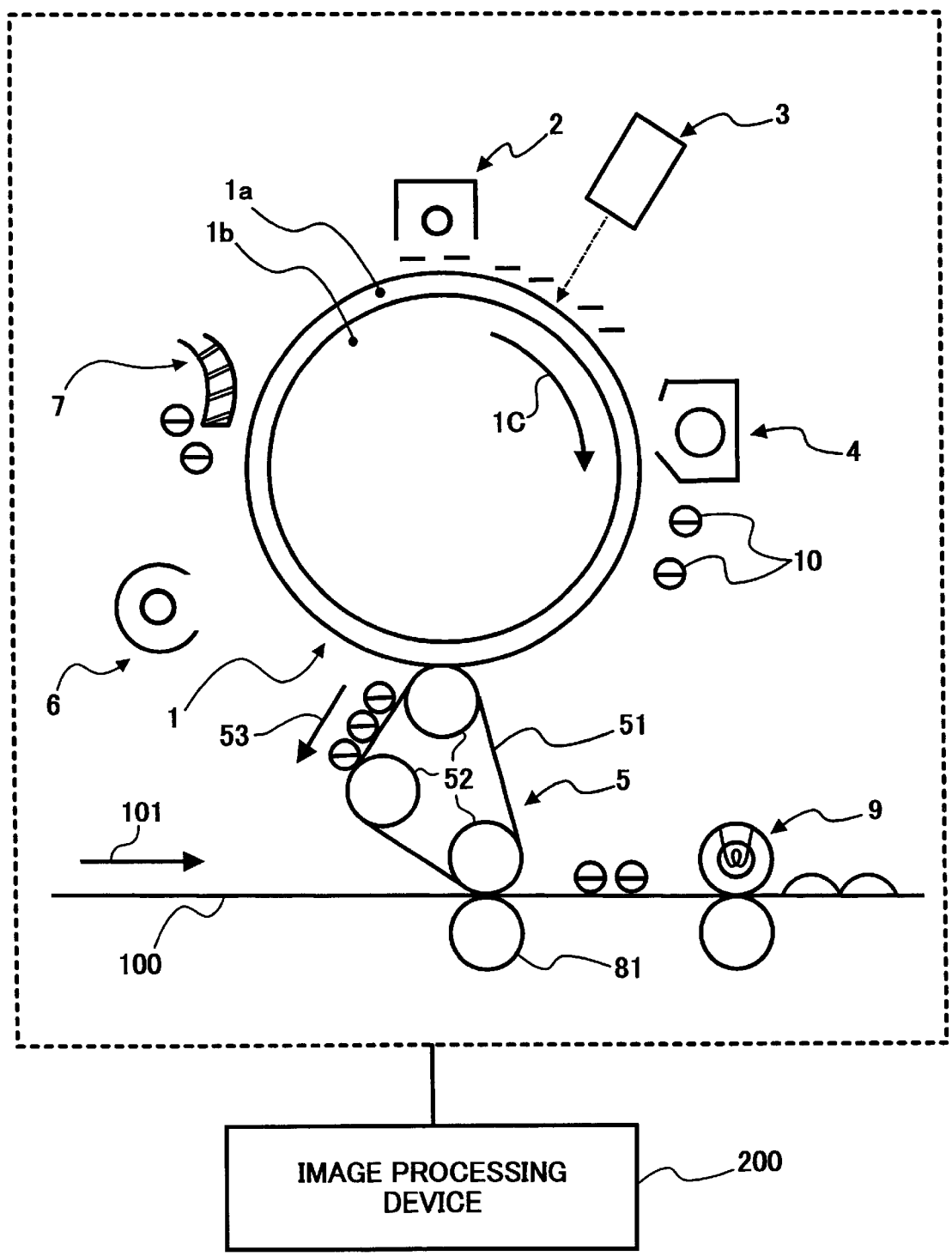
FIG. 1 is a front schematic view illustrating a construction of an image forming apparatus according to an embodiment of the present invention.

Referring now to the drawings, wherein like reference numerals designate identical or corresponding parts throughout the several views, embodiments of the present invention applied to an image forming apparatus employing a digital electrophotographic recording process are now described.

FIG. 1 is a schematic view illustrating a construction of an image forming apparatus according to an embodiment of the present invention. First, a basic construction and operation of the image forming apparatus is described. Arranged around a photoconductive drum 1, which includes a photoreceptor 1a serving as a latent image bearing member and a photoreceptor supporting member 1b supporting the photoreceptor 1a, are a charging device 2, a light beam writing device 3, a developing device 4 which develops a latent image on the photoreceptor 1a with dry developer, an intermediate transfer device 5 serving as a primary transfer device including an intermediate transfer belt 51 as a primary transfer member, a discharging device 6, and a cleaning device 7 including a cleaning blade. In the intermediate transfer device 5, the intermediate transfer belt 51 is seamless and spanned around a plurality of rollers 52, and is driven by a driving device (not shown) such as a motor to rotate in the direction indicated by direction arrow 53. One of the rollers 52 also serves as a transfer bias roller which applies a transfer bias to the intermediate transfer belt 51, to which a predetermined transfer bias voltage is applied from a power source (not shown). Further, a transfer roller 81 serving as a secondary transfer device faces the intermediate transfer belt 51 to transfer a toner image on the intermediate transfer belt 51 to a transfer sheet 100. A transfer bias is applied to the transfer roller 81 from a power source (not shown). Furthermore, a fusing device 9 is provided downstream of the transfer roller 81 in a transfer sheet conveying direction indicated by direction arrow 101.

In the image forming apparatus of FIG. 1, the charging device 2 uniformly charges the photoconductive drum 1 in a predetermined polarity (e.g., a negative polarity in the illustrative image forming apparatus of FIG. 1) while the photoconductive drum 1 is being driven to rotate in the direction indicated by direction arrow 1C. Subsequently, the light beam writing device 3 irradiates the surface of the photoreceptor 1a of the photoconductive drum 1 with a light beam provided by an optical system (not shown), and thereby a latent image is formed on the surface of the photoreceptor 1a. In the illustrative image forming apparatus of FIG. 1, a potential is attenuated on the portion of the surface of the photoreceptor 1a where the latent image is formed. A potential is not changed on the portion of the surface of the photoreceptor 1a where the latent image is not formed (i.e., the charged potential is kept).

The latent image is developed with a toner 10 of a predetermined polarity (e.g., a negative polarity in the illustrative image forming apparatus of FIG. 1) by the developing device 4, and thereby a toner image as a visible image is formed on the photoconductive drum 1. The toner image developed by the developing device 4 is transferred to the surface of the intermediate transfer belt 51 which moves at substantially the same speed as the photoconductive drum 1 at a portion (i.e., a primary transfer region) where the photoconductive drum 1 and the intermediate transfer belt 51 contact each other (primary transfer). When a multi-color image is formed on the intermediate transfer belt 51, each color toner image on the photoconductive drum 1 is repeatedly transferred to the surface of the intermediate transfer belt 51 and is superimposed on a color toner image previously transferred to the intermediate transfer belt 51. Subsequently, the toner image on the intermediate transfer belt 51 is transferred to the surface of the transfer sheet 100 (secondary transfer). The toner image on the transfer sheet 100 is fixed by the fusing device 9, and thereby the image is formed on the transfer sheet 100.

The image forming apparatus according to the embodiment of the present invention includes a control device to control each element of the image forming apparatus. The control device includes an image processing device 200 which processes image data of an image including pixels forming the image such that a gradation of the image is represented by a density of toner adhering pixels of the image forming pixels per unit area of the image. The control device controls to drive the light beam writing device 3 in accordance with image data processed by the image processing device. In the image forming apparatus according to the embodiment of the present invention, a bilevel process is employed wherein respective electrostatic latent images of high density, intermediate density, and highlight (low density) image portions are all formed by the aforementioned saturation writing, and the gradation is represented by changing a density of toner adhering pixels of the image forming pixels per unit area of the image. An image quality in the bilevel process according to the present invention can be more stable than that in the one dot multilevel process.

However, as described earlier, it is known that in the bilevel process, the toner adhering pixels are likely to be sharply outlined in a toner image formed on a transfer member, and thereby the image is likely to produce an impression that the image surface is granular (not smooth).

Through intense study for addressing the above-described problem, the inventors have found that when a size of a pixel toner image of each toner adhering pixel is about 50 μm or less, the visual recognition ability by the human eyes steeply decreases at the distance of distinct vision, specifically at a distance in a range of about 25 cm to 30 cm. It has been also found that the more uniform the size and shape of the pixel toner image is, the lower the visual recognition ability by the human eyes becomes. Therefore, if the bilevel process is employed such that the size of the pixel toner image is uniform and 50 μm or less, a high qualilty and stable image may be obtained in an electrophotographic apparatus.

In the electrophotographic process using dry developer, when a dot of a pixel is developed with the dry developer, it is known that the diameter of the dot of the pixel should be four or more times as large as the diameter of a toner particle for obtaining a stable toner image. Considering that the minimum size of the diameter of the toner particle is about 5 μm, the diameter of the dot of the pixel which can be stably reproduced may be around 20 μm and more.

As described above, in the electrophotographic image forming apparatus employing the bilevel process and dry developer, it may be considered that if a stable pixel toner image of each toner adhering pixel of the toner image whose diameter is in a range of 20 μm to 50 μm can be formed on a recording member, a stable and smooth image with inconspicuous granularity can be obtained.

However, under the condition of the general electrophotographic process employing the bilevel process, in order to obtain a stable pixel toner image on a transfer sheet whose diameter is in a range of 20 μm to 50 μm, it is necessary to meet various conditions. Specifically, it is necessary to have a light beam writing device which emits a light beam of very small diameter, a photoreceptor wherein a latent image is not likely to expand by the diffusion of electric charge even when the latent image is formed by the light beam of small diameter, a developing process for converting faithfully a latent image of a small dot of a pixel to a pixel toner image, a transferring process for transferring a toner image to a transfer sheet without deforming the toner image, and a fixing process for fixing the toner image on the transfer sheet reducing the deformation of the toner image to a minimum. Furthermore, a parameter of each device of the image forming apparatus is correlated each other. For example, the specification of the beam diameter of the light beam writing device may be changed according to the characteristic of the photoreceptor, and each performance of the developing device, the transfer device, and the fusing device. If any of the performance of the above devices is inferior, it is not possible to recover the capability to form the stable pixel toner image on the transfer sheet whose diameter is in a range of 20 μm to 50 μm by other devices.

As described above, because the exacting specification of each device in the image forming apparatus is required to form a stable pixel toner image of each toner adhering pixel of a toner image on a transfer sheet whose diameter is in a range of 20 μm to 50 μm in an electrophotographic process, a cost for each device in the image forming apparatus may be much increased.

Through further intense study, the inventors have found that when a toner scattering occurs at the periphery of a pixel toner image of each toner adhering pixel of a toner image on a transfer sheet, the toner image with a toner scattering can be recognized as more smooth than a toner image without a toner scattering that includes a pixel toner image of the same diameter. The above-described toner scattering indicates a condition wherein a toner sparsely scatters in the pixel toner image as the distance from the center of the pixel toner image increases.

Figure 2A:
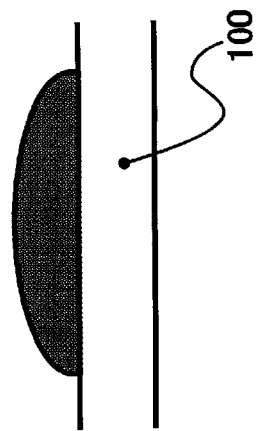
FIGS. 2A through 2C are explanatory views of a pixel toner image formed under a condition wherein a toner scattering is not likely to occur.
Figure 2B:
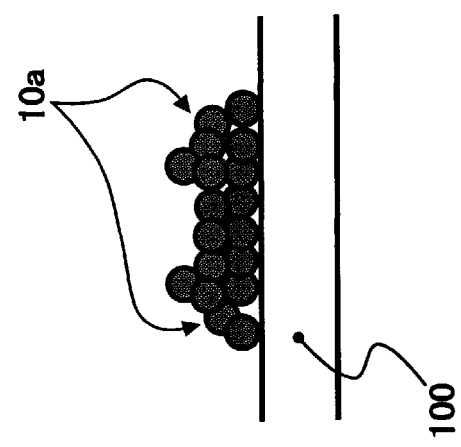
Figure 2C:
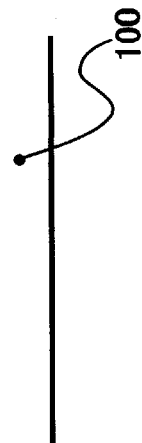
Figure 2D:
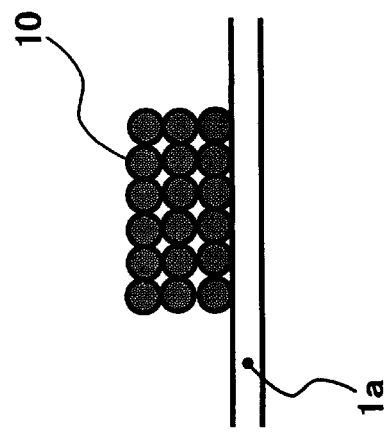
FIGS. 2D through 2F are explanatory views of a pixel toner image formed under a condition wherein a toner scattering is likely to occur.
Figure 2E:
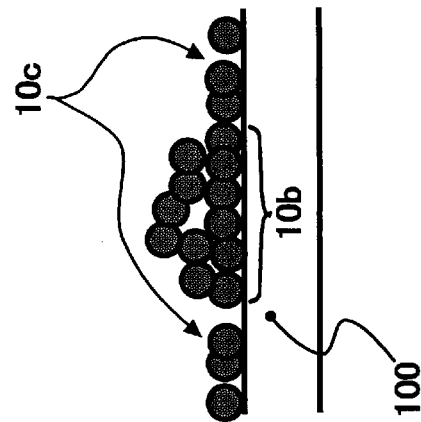
Figure 2F:
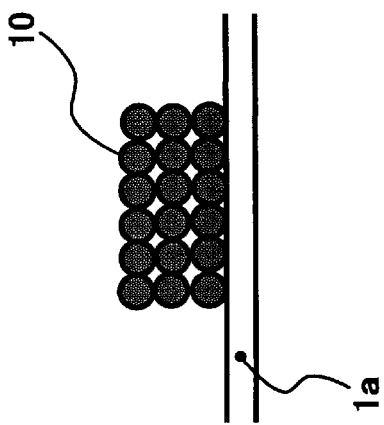

FIGS. 2A through 2C are explanatory views of a pixel toner image which is formed under a condition wherein a toner scattering is not likely to occur. FIGS. 2D through 2F are explanatory views of a pixel toner image which is formed under a condition wherein the toner scattering is likely to occur. Specifically, FIG. 2A illustrates the pixel toner image on the photoreceptor 1a after a dot of a pixel is developed with toner, FIG. 2B illustrates the pixel toner image transferred to the transfer sheet 100, and FIG. 2C illustrates the pixel toner image fixed on the transfer sheet 100. All pixel toner images illustrated in FIGS. 2A through 2C are formed under the condition wherein the toner scattering is not likely to occur. Similarly, FIG. 2D illustrates the pixel toner image on the photoreceptor 1a after a dot of a pixel is developed with toner, FIG. 2E illustrates the pixel toner image transferred to the transfer sheet 100, and FIG. 2F illustrates the pixel toner image fixed on the transfer sheet 100. All pixel toner images illustrated in FIGS. 2D through 2F are formed under the condition wherein the toner scattering is likely to occur.

Referring to FIGS. 2A and 2B, when the pixel toner image on the photoreceptor 1a is transferred to the transfer sheet 100 via the intermediate transfer belt 51 under the condition wherein the toner scattering is not likely to occur, edge portions 10a of the pixel toner image are pressed by a contact pressure between the intermediate transfer belt 51 and the photoconductive drum 1, and thereby the pixel toner image expands on the transfer sheet 100. Referring to FIGS. 2D and 2E, when the pixel toner image on the photoreceptor 1a is transferred to the transfer sheet 100 via the intermediate transfer belt 51 under the condition wherein the toner scattering is likely to occur, the toner is scattered (hereinafter may be referred to as scattered toner 10c) around a nucleus portion 10b of the pixel toner image which has substantially the same diameter as that of the pixel toner image on the photoreceptor 1a illustrated in FIG. 2D. Each pixel toner image illustrated in FIGS. 2B and 2E is fixed on the transfer sheet 100 by the fusing device 9 as illustrated in FIGS. 2C and 2F, respectively.

As described above, when the pixel toner image formed under the condition wherein the toner scattering is not likely to occur is transferred from the photoreceptor 1a to the transfer sheet 100 via the intermediate transfer belt 51, edge portions of the pixel toner image are spread on the transfer sheet 100, and thereby the diameter of the pixel toner image on the transfer sheet 100 becomes larger than that of the pixel toner image on the photoreceptor 1a. In particular, when a multi-color toner image is formed on the transfer sheet 100 with a plurality of color toner images superimposed on each other, the multi-color toner layers are easily pressed by the pressure given in the transferring and fixing processes. As a result, the multi-color toner image tends to expand on the transfer sheet 100.

On the other hand, when the pixel toner image formed under the condition wherein the toner scattering is likely to occur is transferred from the photoreceptor 1a to the transfer sheet 100 via the intermediate transfer belt 51, the toner is scattered sparsely around the nucleus portion 10b of the pixel toner image, which has substantially the same diameter as that of the pixel toner image on the photoreceptor 1a. As a result, the toner image with scattered toner is visually recognized as a small nucleus portion and an inconspicuous fog-like image of low density around the nucleus portion. As compared to the toner image without scattered toner, it is harder for the human eyes to visually recognize the toner image with scattered toner.

Therefore, the image forming apparatus according to the embodiment of the present invention employs a construction wherein the diameter of a pixel toner image of each toner adhering pixel of a toner image on the photoreceptor 1a is configured to be in a range of 20 μm to 50 μm, and an image forming condition, such as, for example, a transferring condition, is configured to be set such that a toner scattering is likely to occur.

First, a construction which allows the diameter of the pixel toner image of each toner adhering pixel of the toner image on the photoreceptor 1a to be in a range of 20 μm to 50 μm is described. In order to set the diameter of the pixel toner image of each toner adhering pixel of the toner image on the photoreceptor 1a to be in the above described range, the conditions of each device of the image forming apparatus need to be set accordingly, such as, for example, the diameter of the light beam emitted from the light beam writing device 3, the characteristic of the photoreceptor 1a, the developing condition of the developing device 4, and etc.

The image forming apparatus according to the embodiment of the present invention employs a photoreceptor as the photoreceptor 1a which has a characteristic suitable for forming the above-described pixel toner image, i.e., a characteristic by which a latent image can be faithfully formed on the photoreceptor 1a in accordance with the written light beam of small diameter. For example, when a generally used organic photoconductor (hereinafter referred to as an OPC) including two layers (i.e., a charge generation layer, and a charge transport layer which is provided on the charge generation layer) is employed as the photoreceptor 1a, the diameter of the pixel toner image which is developed on the surface of the photoreceptor 1a under the conditions of different diameters of the writing light beam and various developing conditions can be measured. The above-described two layers of the OPC may be collectively referred to simply as a photoreceptor layer. Consequently, it is found that when the thickness of the photoreceptor layer is 15 μm or more, a dot of a pixel whose diameter is 50 μm or less can not be stably reproduced under the condition of the saturation writing, even though the diameter of the writing light beam is decreased to 50 μm or less.

Specifically, the inventors of the present invention formed a dot of a pixel whose diameter is about 50 μm by a light beam whose beam diameter is 50 μm, and measured a relation between the thickness of the photoreceptor layer and unevenness of the diameter size of the dot of the pixel. It was found that when the thickness of the photoreceptor layer exceeds 15 μm, the unevenness of the dot size increases sharply. Further, even though the beam diameter is decreased to 30 μm when the thickness of the photoreceptor layer exceeds 15 μm, while the unevenness of the diameter size of the dot of the pixel can be decreased, the diameter of the dot of the pixel remains 50 μm. Thereby, it was found that the thickness of the photoreceptor layer should be 15 μm or less in order to make the diameter of the dot of the pixel small.

As a main reason for the unevenness of the diameter size of the dot of the pixel according to the thickness of the photoreceptor layer, it is assumed that when electric charge generated in the charge generation layer by the writing light beam moves into the charge transport layer toward the surface of the photoreceptor 1a to neutralize the charge of the surface of the photoreceptor 1a, the moving electric charge is diffused in the direction perpendicular to the thickness direction of the photoreceptor by mutual repulsive forces according to the thickness of the photoreceptor layer. As the thickness of the photoreceptor layer increases, the electric charge is diffused to a larger extent in the photoreceptor.

Therefore, it is preferable to employ a photoreceptor as the photoreceptor 1 a wherein an electric charge of the light beam is generated in a vicinity of the photoreceptor opposite to the surface where the latent image is formed (i.e., toward the photoreceptor supporting machine), and wherein the thickness of the photoreceptor layer is 15 μm or less. In the above-described photoreceptor, the electric charge of the portion of the photoreceptor to which the light beam is incident, is neutralized by the electric charge of a polarity opposite to the polarity of the charged surface of the photoreceptor (e.g., a positive polarity in the illustrative image forming apparatus of FIG. 1). This neutralizing charge is generated by the light beam in the vicinity of the photoreceptor at the side of the photoreceptor supporting member 1b and moves in the photoreceptor layer toward the surface of the photoreceptor to thereby form a latent image on the surface of the photoreceptor. Because the thickness of the photoreceptor layer is 15 μm or less, even though the above-described electric charge is diffused by mutual repulsive forces while moving in the photoreceptor layer, the diffusion of the electric charge is not likely to be a large extent. Therefore, a latent image is not likely to expand and a small latent image can be easily formed on the photoreceptor which becomes small pixel toner images of toner adhering pixels of a toner image which is not visually recognized by the human eyes. This configuration is effective in performing the bilevel process.

Alternatively, another photoreceptor as the photoreceptor 1a can be employed wherein an electric charge of the light beam is generated in a vicinity of the photoreceptor where a latent image is formed (i.e., the surface of the photoreceptor). In the above-described alternative photoreceptor, an electric charge of the same polarity as that of the charged surface of the photoreceptor (e.g., a negative polarity in the illustrative image forming apparatus of FIG. 1) is generated by the light beam in the vicinity of the surface of the photoreceptor and moves in the photoreceptor toward a vicinity of the photoreceptor at the side of the photoreceptor supporting member 1b to thereby form the latent image. In the above-described alternative photoreceptor, the electric charge is also not diffused to a large extent, and thereby the latent image is not likely to expand. Therefore, a small latent image can be easily formed on the photoreceptor which becomes small pixel toner images of toner adhering pixels of a toner image which is not visually recognized by the human eyes. This configuration is also effective in performing the bilevel process.

As an example of the above-described alternative photoreceptor, an inorganic photoconductor can be used, such as, for example, a selenium photoreceptor, an amorphous silicon photoreceptor, and etc. From the viewpoint of the stability of the surface layer of the photoreceptor, the amorphous silicon photoreceptor is most preferable. In addition, because the amorphous silicon photoreceptor is superior in mechanical strength, the useful life of the photoreceptor is extended. Improvements such as adding a surface layer to the above-described photoreceptors, for example, in order to reduce the frictional resistance of the photoreceptor are possible as long as the characteristic of the photoreceptors is not impaired.

When the above-described photoreceptor wherein an electric charge is generated by a light beam in the vicinity of the surface of the photoreceptor where the latent image is formed is used as the photoreceptor 1a is used, it is preferable to use a photoreceptor whose layer thickness is 20 μm or less. This is because when the above-described electric charge of the opposite polarity to that of the charged surface of the photoreceptor (e.g., a positive polarity in the illustrative image forming apparatus of FIG. 1) remains on the surface of the photoreceptor, an electric charge which has the same charge amount as the above-described electric charge remaining on the surface of the photoreceptor and has opposite polarity to the above-described electric charge is induced in the photoreceptor supporting member 1b (hereinafter referred to as a counter charge). The counter charge spreads to a larger extent than the electric charge remaining on the surface of the photoreceptor. When a latent image on the photoreceptor is developed with a toner at a developing region between the photoreceptor and a developer bearing member (not shown) of the developing device 4, an electric field is generated between the developer bearing member and the surface of the photoreceptor. In this case, the line of electric force spreads around edge portions of a dot of a pixel on the photoreceptor by the influence of the counter charge. As a result, when the dot of the pixel is developed with toner, the diameter of the pixel toner image increases.

It is preferable to keep the spread of the counter charge to the smallest extent. The spread of the counter charge depends on various conditions such as the layer thickness and the permittivity of the photoreceptor, the thickness and the permittivity of the developer, and so on. Under regular developing conditions wherein, such as, for example, a developing gap (a gap between the photoreceptor and the developer bearing member) is 200 μm or more, each permittivity of the photoreceptor and the developer is in a range of 3 to 10, and the layer thickness of the photoreceptor is 40 μm, the spread of the counter charge corresponds to the layer thickness of the photoreceptor, i.e., the counter charge spreads to an extent substantially the same as the layer thickness of the photoreceptor. Accordingly, in order to form the above-described pixel toner image of small diameter, it is preferable to set the layer thickness of the photoreceptor to be small, specifically, to 20 μm or less.

The image forming apparatus in FIG. 1 employs the OPC whose layer thickness is about 15 μm as the photoreceptor 1a. Further, the image forming apparatus in FIG. 1 employs a laser optical system as the light beam writing device 3, which irradiates the surface of the photoreceptor 1a with a laser beam of 15 μm diameter to form an image of 600 dpi (dot per inch) density. Thereby, it is configured that a pixel toner image of each toner adhering pixels of a toner image on the photoreceptor 1a is formed such that the diameter of the pixel toner image is small, i.e., in a range of 20 μm to 50 μm.

Next, a construction which allows the toner scattering to be likely to occur is described. In the image forming apparatus according to the embodiment of the present invention, a toner image on the photoreceptor 1a is transferred to the transfer sheet 100 by a transfer device which includes the intermediate transfer belt 51 as a primary transfer member, the intermediate transfer device 5 serving as a primary transfer device which transfers the toner image on the photoreceptor 1a to the intermediate transfer belt 51, and the transfer roller 81 serving as a secondary transfer device which transfers the toner image on the intermediate transfer belt 51 to the transfer sheet 100. In the transfer device, in order to efficiently transfer the toner image in a two-time transfer process, it is necessary to make the condition wherein the toner transfer is easily generated. Accordingly, toner scattering is generated in the pixel toner image. In the image forming apparatus according to the embodiment of the present invention employing the two-time transfer process, as compared to a one-time transfer process wherein a toner image on a photoreceptor is transferred directly to a transfer sheet, the pixel toner image of each toner adhering pixel of the toner image is likely to have a nucleus portion and a toner scattering around the nucleus portion.

In the image forming apparatus in FIG. 1, when the pixel toner image which is formed on the photoreceptor 1a and whose diameter is in a range of 20 μm to 50 μm, is transferred to the transfer sheet 100 by the above-described transfer device via the primary and secondary transfer processes, the boundary between the edge portions of the pixel toner image of the toner adhering pixel and the background portions of the toner adhering pixel is blurred on the transfer sheet 100. Consequently, the toner adhering pixel of the toner image becomes inconspicuous. Further, the pixel toner image of each toner adhering pixel of the toner image formed on the transfer sheet 100 includes a nucleus portion whose diameter is substantially the same as that of the pixel toner image on the photoreceptor 1a, and a toner scattered around the nucleus portion. As above-described, because the diameter of the pixel toner image on the photoreceptor 1a becomes in a range of 20 μm to 50 μm, the size of the nucleus portion of the pixel toner image can be held to an extent hard to be visually recognized by the human eyes. Furthermore, the size of the nucleus portion of the pixel toner image can be kept stable. Referring to the scattered toner, because the toner is sparsely scattered around the nucleus portion of the pixel toner image, and the scattered toner exists typically independently each other, it is hard for the human eyes to visually recognize the scattered toner. Thus, both the nucleus portion and the toner scattered around the nucleus portion of the pixel toner image of each toner adhering pixel of the toner image on the transfer sheet 100, are hard to be visually recognized by the human eyes. Thereby, the pixel toner image of each toner adhering pixel of the toner image becomes inconspicuous on the transfer sheet 100. As a result, a smooth image with inconspicuous granularity can be stably obtained. In particular, it is possible to obtain a high quality image wherein halftone (intermediate density) and highlight (low density) image portions are stably reproduced.

The inventors have confirmed the effects of the embodiment that when the diameter of pixel toner image of each toner adhering pixel formed on the photoreceptor 1a is set to about 50 μm, and the pixel toner image is transferred to the transfer sheet 100 in a condition wherein a toner scattering is likely to occur, a smooth image can be recognized even though the diameter of the pixel toner image including the scattered toner becomes 50 μm or more on the transfer sheet 100. Furthermore, because the bilevel process is employed in the image forming apparatus of the present invention, the image quality can be stable. On the other hand, when the above-described pixel toner image whose diameter is set to about 50 μm on the photoreceptor 1a is transferred to the transfer sheet 100 under a regular transferring condition, the diameter of the pixel toner image becomes 50 μm or more and the pixel toner image becomes sharply outlined due to the deformation of the pixel toner image. Although the diameter of the whole image is slightly smaller than the former described image, the image is likely to produce an impression that the image surface is granular.

Figure 3B:
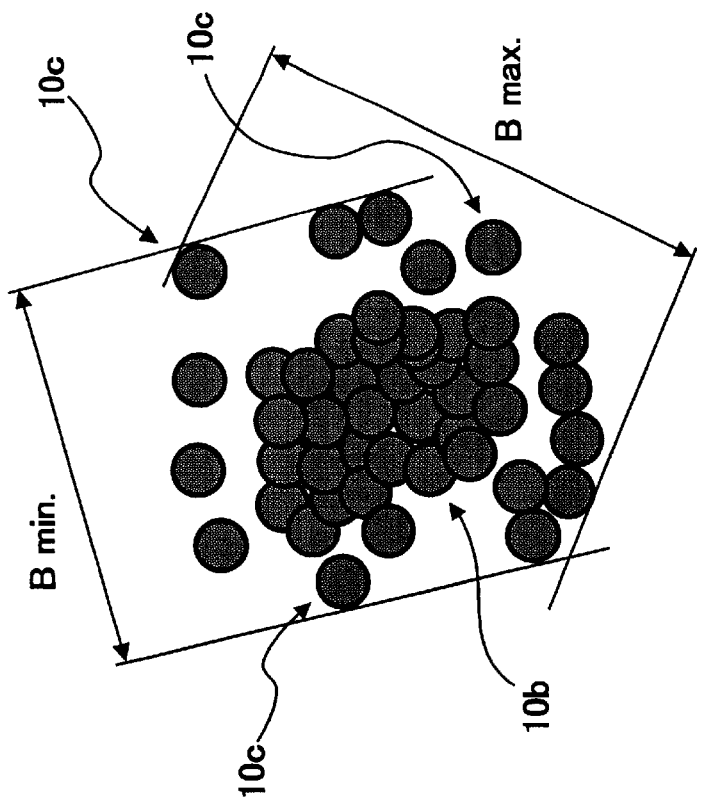
FIGS. 3A and 3B are explanatory views of a pixel toner image of a toner adhering pixel of a toner image on a transfer sheet which is not fixed thereon.
Figure 3A:
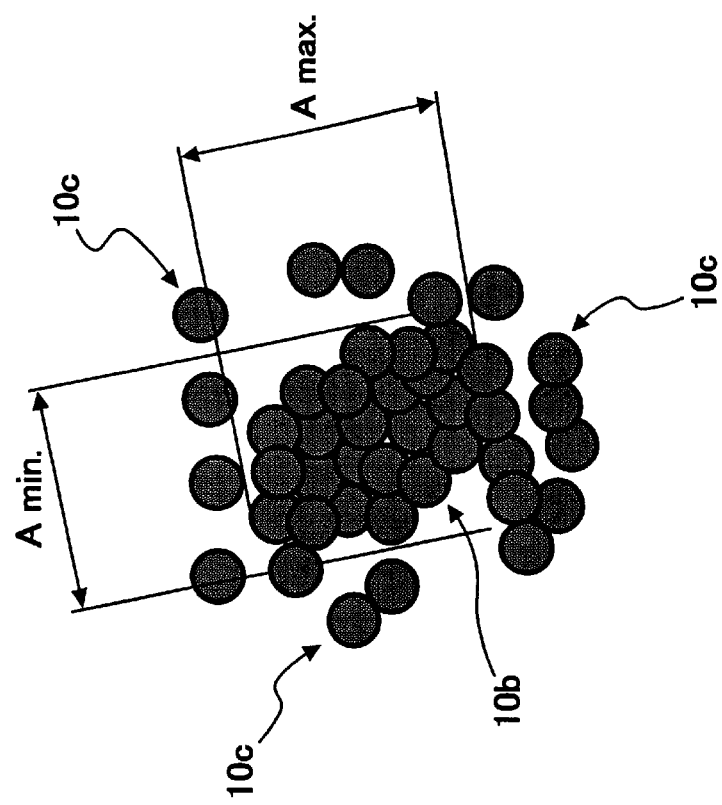
Figure 4:
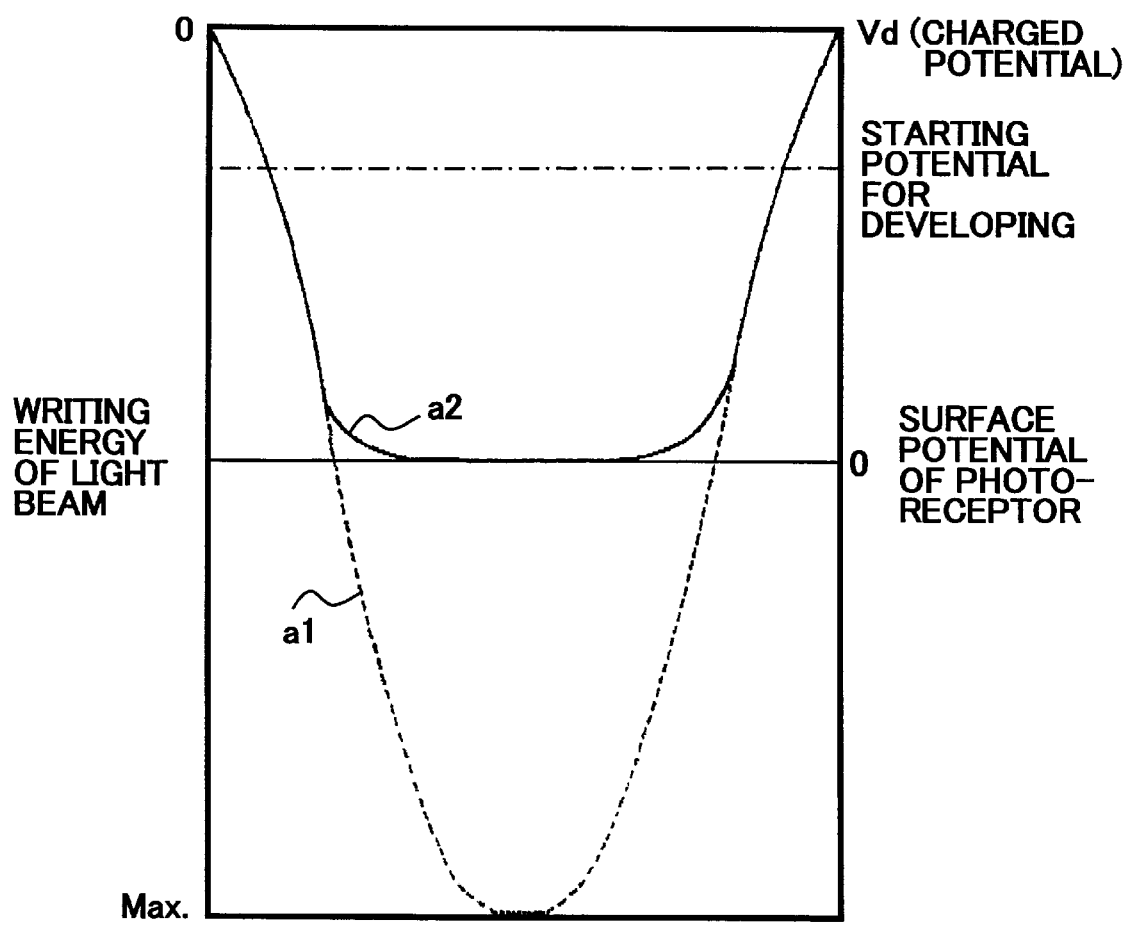
FIG. 4 is a graph illustrating a relation between writing energy of a light beam and a surface potential of a photoreceptor.

FIGS. 3A and 3B are explanatory views of a pixel toner image of a toner adhering pixel of a toner image on the transfer sheet 100 which is not yet fixed thereon. FIGS. 3A and 3B illustrate the same pixel toner image. As described above, the pixel toner image includes the nucleus portion 10b and the scattered toner 10c which is scattered around the nucleus portion 10b. In FIGS. 3A and 3B, the toner which is not in point contact with the nucleus portion 10b is regarded to be included in the scattered toner 10c. Hereinafter, a level of the toner scattering is defined.

As illustrated in FIG. 3A, a minimum width (A min) and a maximum width (A max) of the nucleus portion 10b not including the scattered toner 10c are measured. Then, an average diameter A is obtained by dividing the sum of the minimum width (A min) and the maximum width (A max) by two. Further, as illustrated in FIG. 3B, a minimum with (B min) and a maximum width (B max) of the whole pixel toner image including the scattered toner 10c are measured. Similarly, an average diameter B is obtained by dividing the sum of the minimum width (B min) and the maximum width (B max) by two. The ratio of B:A is defined as the level of the toner scattering.

Various levels of the toner scattering were calculated after the independent pixel toner image on the transfer sheet 100 which is formed under various transferring conditions and is not fixed thereon was photographed and printed magnifying 200 times. Further, when an image including the pixel toner images which were formed under the various transferring conditions was fixed on the transfer sheet 100 and compared each other, it was found that an image including the pixel toner image wherein the level of toner scattering is 1.5 or more can be recognized as smooth image with less granularity. Therefore, it is preferable to set an image forming condition such that the level of the toner scattering is 1.5 or more. Specifically, it is preferable to set transferring conditions, such as, for example, a transfer bias voltage/current, the resistance value of the intermediate transfer belt 51, and the diameter of the transfer roller 81, and the fluidity of toner. In order to adjust the fluidity of toner, a shape of toner, specifically a sphericity, an amount of external additive, a type and a mixing condition of the toner may be adjusted. When the sharpness of line and character images is taken into account, it is preferable that the level of the toner scattering is 3.0 or less.

Next, an image processing method for gradation representation in the image forming apparatus according to the embodiment of the present invention is described. As an image processing method for the gradation representation generally used in an electrophotography process, a dither method is known. In the dither method, a matrix including a plurality of pixels is set. The gradation is represented by a matrix pattern such that when density data of each pixel represented by the multilevel process is compared with density level threshold value set by a pixel, and when the density of each pixel exceeds the density level threshold value, the pixel is determined as an image, and when the density of each pixel falls below the density level threshold value, the pixel is determined as a background. As a setting method for the density level threshold value, a dot concentration pattern is much employed which matches the developing characteristic of the electrophotography process. Because the matrix is ordered in the dither method, granularity is not likely to be visually recognized by the human eyes. However, in the dither method, in order to increase the number of gradations, the matrix size needs to be increased. As the matrix size increases, the number of toner adhering pixels in the matrix increases. When the matrix size increases too much, the granularity is likely to be visually recognized by the human eyes. Therefore, it is necessary to control the matrix size to an extent about 120 $\mu$m X 120 $\mu$m and to reduce the size of each pixel for obtaining necessary number of gradations in the matrix. Thus, it is difficult to obtain both smooth image and much number of gradations in the dither method. As a result, the above-described one dot multilevel process needs to be employed but an image quality especially for a halftone intermediate image portion is unstable as described before.

The above-described difficulties may be applied not only to the dither method employing the concentrated dot matrix but also to any methods wherein a gradation of an image is represented by a number of toner adhering pixels.

Therefore, as a method for gradation representation in the image forming apparatus according to the embodiment of the present invention, it is preferable to employ a method wherein a gradation of an image is represented by a distance between toner adhering pixels, such as, for example, an error diffusion method. In the error diffusion method, when density data of each pixel represented by the multilevel process is converted to bilevel data, a gradation of an image is represented by diffusing the error between the bilevel value and the multilevel density value. In the error diffusion method, a distance between toner adhering pixels becomes greater in a low density image portion of an image, and becomes smaller in a high density image portion. As compared to the method wherein a gradation of an image is represented by a number of toner adhering pixels, toner adhering pixels are not likely to be concentrated in the error diffusion method, so that pixel toner images are not likely to be easily recognized by the human eyes. Consequently, an appropriate quality image with inconspicuous granularity can be obtained in the error diffusion method. In addition, because the toner adhering pixels are not likely to be sharply outlined in a toner image owing to the toner scattering in the image forming apparatus according to the embodiment of the present invention, a smooth image like a silver halide photograph can be obtained.

Next, an image forming apparatus according to a second embodiment of the present invention is described. An explanation for a basic construction of the image forming apparatus of the second embodiment is omitted because it is similar to that of the image forming apparatus of the first embodiment.

Through intense study, the inventors have found that when the toner scattering is generated such that the level of the toner scattering is 1.5 or more, toner adhering pixels of toner image becomes inconspicuous on the transfer sheet 100 even when a diameter of a pixel toner image of each toner adhering pixel of a toner image on the photoreceptor 1a is greater than 50 $\mu$m.

The image forming apparatus according to the second embodiment employs a construction wherein the toner scattering can be generated around a nucleus portion of a pixel toner image such that the level of the toner scattering is 1.5 or more. Specifically, an image forming condition is set such that the level of the toner scattering is 1.5 or more. In detail, transferring conditions when a toner image on the photoreceptor 1a is transferred to the transfer sheet 100 are set, such as, for example, a transfer bias voltage/current, and the resistance value of the intermediate transfer belt 51, and the fluidity of toner is set. As described above, in order to adjust the fluidity of toner, a shape of toner, specifically a sphericity, an amount of external additive, a type and a mixing condition of the toner may be adjusted.

In order to make the toner scattering be likely to occur, it is advantageous to employ a transfer device including a primary transfer member, a primary transfer device which transfers a toner image on the photoreceptor 1a to the primary transfer member, and a secondary transfer device which transfers the toner image on the primary transfer member to the transfer sheet 100 rather than to employ a transfer device which transfers the toner image on the photoreceptor 1a directly to the transfer sheet 100. Alternatively, if the level of the toner scattering can be set to 1.5 or more, the above-described transfer device which transfers the toner image on the photoreceptor 1a directly to the transfer sheet 100 can be employed. For example, the level of the toner scattering may be set to 1.5 or more by adjusting a transfer bias voltage/current, a transfer bias applying position at a nip part between the photoreceptor 1a and the transfer sheet 100, and the resistance value of a transfer belt when a belt transfer method is employed.

Owing to the above-described construction of the image forming apparatus, the toner adhering pixel of the toner image becomes inconspicuous, and a smooth image with less granularity can be stably obtained.

Also in the image forming apparatus according to the second embodiment of the present invention, when the sharpness of line and character images is taken into account, it is preferable that the level of the toner scattering is 3.0 or less.

Further, as a method for gradation representation in the image forming apparatus of this embodiment, it is also preferable to employ a method wherein a gradation of an image is represented by a distance between toner adhering pixels, such as, for example, an error diffusion method. In the error diffusion method, a distance between toner adhering pixels becomes greater in a low density image portion of an image, and becomes smaller in a high density image portion. As compared to the method wherein a gradation of an image is represented by a number of toner adhering pixels, toner adhering pixels are not likely to be concentrated in the error diffusion method, so that pixel toner images are not likely to be easily recognized by the human eyes. Consequently, an appropriate quality image with inconspicuous granularity can be obtained in the error diffusion method. In addition, because the toner adhering pixels are not likely to be sharply outlined in a toner image owing to the toner scattering in the image forming apparatus according to the embodiment of the present invention, a smooth image like a silver halide photograph can be obtained.

Numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. An image forming apparatus, comprising:
    an image bearing member;
    an image processing device configured to process image data of an image including image forming pixels forming the image such that a gradation of the image is represented by a density of toner adhering pixels of the image forming pixels per unit area of the image;
    a latent image forming device configured to form an electrostatic latent image of the image on the image bearing member in accordance with the image data processed by the image processing device;
    a developing device configured to visualize the electrostatic latent image on the image bearing member to a toner image; and
    a transfer device configured to transfer the toner image on the image bearing member to a transfer member,
    wherein a diameter of a pixel toner image of each toner adhering pixel of the toner image on the image bearing member is in a range of 20 $\mu$m to 50 $\mu$m and a toner scattering is generated around a nucleus portion of the pixel toner image of each toner adhering pixel of the toner image on the transfer member, and
    wherein the transfer device includes a primary transfer member, a primary transfer device configured to transfer the toner image on the image bearing member to the primary transfer member, and a secondary transfer device configured to transfer the toner image on the primary transfer member to the transfer member.

2. The image forming apparatus according to claim 1, wherein a diameter of the pixel toner image is at least 1.5 times a diameter of the nucleus portion of the pixel toner image on the transfer member.

3. The image forming apparatus according to claim 2, wherein the toner scattering is generated around the nucleus portion of the pixel toner image of each toner adhering pixel of the toner image on the transfer member, and wherein the diameter of the pixel toner image is at most 3 times the diameter of the nucleus portion of the pixel toner image on the transfer member.

4. The image forming apparatus according to claim 1, wherein the image bearing member comprises a layer of a photoreceptor, and an electric charge is generated, by a light beam, in a vicinity of the photoreceptor opposite to a surface of the photoreceptor where the latent image is formed, and a thickness of the layer of the photoreceptor is 15 $\mu$m or less.

5. The image forming apparatus according to claim 2, wherein the image bearing member comprises a layer of a photoreceptor, and an electric charge is generated, by a light beam, in a vicinity of the photoreceptor opposite to a surface of the photoreceptor where the latent image is formed, and a thickness of the layer of the photoreceptor is 15 $\mu$m or less.

6. The image forming apparatus according to claim 3, wherein the image bearing member comprises a layer of a photoreceptor, and an electric charge is generated, by a light beam, in a vicinity of the photoreceptor opposite to a surface of the photorececptor where the latent image is formed, and a thickness of the layer of the photoreceptor is 15 $\mu$m or less.

7. The image forming apparatus according to claim 1, wherein the image bearing member comprises a photoreceptor, and an electric charge is generated, by a light beam, in a vicinity of a surface of the photoreceptor where the latent image is formed.

8. The image forming apparatus according to claim 2, wherein the image bearing member comprises a photoreceptor, and an electric charge is generated, by a light beam, in a vicinity of a surface of the photoreceptor where the latent image is formed.

9. The image forming apparatus according to claim 3, wherein the image bearing member comprises a photoreceptor, and an electric charge is generated, by a light beam, in a vicinity of a surface of the photoreceptor where the latent image is formed.

10. The image forming apparatus according to claim 7, wherein the image bearing member comprises an amorphous silicon photoreceptor.

11. An image forming apparatus, comprising:
    an image bearing member;
    an image processing device configured to process image data of an image including image forming pixels forming the image such that a gradation of the image is represented by a density of toner adhering pixels of the image forming pixels per unit area of the image;

a latent image forming device configured to form an electrostatic latent image of the image on the image bearing member in accordance with the image data processed by the image processing device;

a developing device configured to visualize the electrostatic latent image on the image bearing member to a toner image; and a transfer device configured to transfer the toner image on the image bearing member to a transfer member, wherein a toner scattering is generated around a nucleus portion of the pixel toner image of each toner adhering pixel of the toner image on the transfer member, and wherein a diameter of the pixel toner image is at least 1.5 times a diameter of the nucleus portion of the pixel toner image on the transfer member.

12. The image forming apparatus according to claim 11, wherein the transfer device includes a primary transfer member, a primary transfer device configured to transfer the toner image on the image bearing member to the primary transfer member, and a secondary transfer device configured to transfer the toner image on the primary transfer member to the transfer member.

13. The image forming apparatus according to claim 11, wherein the toner scattering is generated around the nucleus portion of the pixel toner image of each toner adhering pixel of the toner image on the transfer member, and wherein the diameter of the pixel toner image is not more than 3 times the diameter of the nucleus portion of the pixel toner image on the transfer member.

14. The image forming apparatus according to claim 12, wherein the toner scattering is generated around the nucleus portion of the pixel toner image of each toner adhering pixel of the toner image on the transfer member, and wherein the diameter of the pixel toner image is not more than 3 times the diameter of the nucleus portion of the pixel toner image on the transfer member.

15. An image forming apparatus, comprising:

an image bearing member;

an image processing device configured to process image data of an image including image forming pixels forming the image such that a gradation of the image is represented by a distance between toner adhering pixels of the image forming pixels;

a latent image forming device configured to form an electrostatic latent image of the image on the image bearing member in accordance with the image data processed by the image processing device;

a developing device configured to visualize the electrostatic latent image on the image bearing member to a toner image; and a transfer device configured to transfer the toner image on the image bearing member to a transfer member, wherein a diameter of a pixel toner image of each toner adhering pixel of the toner image on the image bearing member is in a range of 20 $\mu$m to 50 $\mu$m and a toner scattering is generated around a nucleus portion of the pixel toner image of each toner adhering pixel of the toner image on the transfer member, and wherein the transfer device includes a primary transfer member, a primary transfer device configured to transfer the toner image on the image bearing member to the primary transfer member, and a secondary transfer device configured to transfer the toner image on the primary transfer member to the transfer member.

16. An image forming apparatus, comprising:

an image bearing member;

an image processing device configured to process image data of an image including image forming pixels forming the image such that a gradation of the image is represented by a distance between toner adhering pixels of the image forming pixels;

a latent image forming device configured to form an electrostatic latent image of the image on the image bearing member in accordance with the image data processed by the image processing device;

a developing device configured to visualize the electrostatic latent image on the image bearing member to a toner image; and a transfer device configured to transfer the toner image on the image bearing member to a transfer member, wherein a toner scattering is generated around a nucleus portion of the pixel toner image of each toner adhering pixel of the toner image on the transfer member, and wherein a diameter of the pixel toner image is at least 1.5 times a diameter of the nucleus portion of the pixel toner image on the transfer member.

17. An image forming apparatus, comprising:

means for bearing an image;

means for processing image data of an image including image forming pixels forming the image such that a gradation of the image is represented by a density of toner adhering pixels of the image forming pixels per unit area of the image;

means for forming an electrostatic latent image of the image on the image bearing means in accordance with the image data processed by the image data processing means;

means for visualizing the electrostatic latent image on the image bearing means to a toner image; and means for transferring the toner image on the image bearing means to a transfer member, wherein a diameter of a pixel toner image of each toner adhering pixel of the toner image on the image bearing means is in a range of 20 $\mu$m to 50 $\mu$m and a toner scattering is generated around a nucleus portion of the pixel toner image of each toner adhering pixel of the toner image on the transfer member, and wherein the transferring means includes a primary transfer member, primary transferring means for transferring the toner image on the image bearing means to the primary transfer member, and secondary transferring means for transferring the toner image on the primary transfer member to the transfer member.

18. The image forming apparatus according to claim 17, wherein a diameter of the pixel toner image is at least 1.5 times a diameter of the nucleus portion of the pixel toner image on the transfer member.

19. The image forming apparatus according to claim 18, wherein the toner scattering is generated around the nucleus portion of the pixel toner image of each toner adhering pixel of the toner image on the transfer member, and wherein the diameter of the pixel toner image is not more than 3 times the diameter of the nucleus portion of the pixel toner image on the transfer member.

20. The image forming apparatus according to claim 17, wherein the image bearing means comprises a layer of a photoreceptor, and an electric charge is generated, by a light beam, in a vicinity of the photoreceptor opposite to a surface of the photoreceptor where the latent image is formed, and a thickness of the layer of the photoreceptor is 15 $\mu$m or less.

21. The image forming apparatus according to claim 17, wherein the image bearing means comprises a photoreceptor, and an electric charge is generated, by a light beam, in a vicinity of a surface of the photoreceptor where the latent image is formed.

22. The image forming apparatus according to claim 21, wherein the image bearing means comprises an amorphous silicon photoreceptor.

23. An image forming apparatus, comprising:

means for bearing an image;

means for processing image data of an image including image forming pixels forming the image such that a gradation of the image is represented by a density of toner adhering pixels of the image forming pixels per unit area of the image;

means for forming an electrostatic latent image of the image forming pixels on the image bearing means in accordance with the image data processed by the image data processing means;

means for visualizing the electrostatic latent image on the image bearing means to a toner image; and means for transferring the toner image on the image bearing means to a transfer member, wherein a toner scattering is generated around a nucleus portion of the pixel toner image of each toner adhering pixel of the toner image on the transfer member, and wherein a diameter of the pixel toner image is at least 1.5 times a diameter of the nucleus portion of the pixel toner image on the transfer member.

24. The image forming apparatus according to claim 23, wherein the transferring means includes a primary transfer member, primary transferring means for transferring the toner image on the image bearing means to the primary transfer member, and secondary transferring means for transferring the toner image on the primary transfer member to the transfer member.

25. The image forming apparatus according to claim 23, wherein the toner scattering is generated around the nucleus portion of the pixel toner image of each toner adhering pixel of the toner image on the transfer member, and wherein the diameter of the pixel toner image is not more than 3 times the diameter of the nucleus portion of the pixel toner image on the transfer member.

26. An image forming apparatus, comprising:

means for bearing an image;

means for processing image data of an image including image forming pixels forming the image such that a gradation of the image is represented by a distance between toner adhering pixels of the image forming pixels;

means for forming an electrostatic latent image of the image on the image bearing means in accordance with the image data processed by the image data processing means;

means for visualizing the electrostatic latent image on the image bearing means to a toner image; and means for transferring the toner image on the image bearing means to a transfer member, wherein a diameter of a pixel toner image of each toner adhering pixel of the toner image on the image bearing means is in a range of 20 $\mu$m to 50 $\mu$m, and wherein the transferring means includes a primary transfer member, primary transferring means for transferring the toner image on the image bearing means to the primary transfer member, and secondary transferring means for transferring the toner image on the primary transfer member to the transfer member.

27. An image forming apparatus, comprising:

means for bearing an image;

means for processing image data of an image including image forming pixels forming the image such that a gradation of the image is represented by a distance between toner adhering pixels of the image forming pixels;

means for forming an electrostatic latent image of the on the image bearing means in accordance with the image data processed by the image data processing means;

means for visualizing the electrostatic latent image of the image on the image bearing means to a toner image; and means for transferring the toner image on the image bearing means to a transfer member, wherein a toner scattering is generated around a nucleus portion of the pixel toner image of each toner adhering pixel of the toner image on the transfer member, and wherein a diameter of the pixel toner image is at least 1.5 times a diameter of the nucleus portion of the pixel toner image on the transfer member.

* * * * *